(12) United States Patent
Levine et al.

(10) Patent No.: US 12,565,160 B2
(45) Date of Patent: Mar. 3, 2026

(54) ACCESSORY BASE PLATE WITH POWER CONNECTION ROUTING

(71) Applicant: Ford Global Technologies, LLC, Dearborn, MI (US)

(72) Inventors: Eric Scott Levine, Novi, MI (US); Matthew B. Rutman, Westland, MI (US); Ming Hong Choi, Lassalle (CA); Stuart C. Salter, White Lake, MI (US); Jeffrey Sturges, Grosse Pointe Farms, MI (US); Michael Lozano, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 383 days.

(21) Appl. No.: 18/206,657

(22) Filed: Jun. 7, 2023

(65) Prior Publication Data

US 2024/0409044 A1 Dec. 12, 2024

(51) Int. Cl.
| | |
|---|---|
| *B60R 16/02* | (2006.01) |
| *B60J 7/16* | (2006.01) |
| *B60P 7/08* | (2006.01) |

(52) U.S. Cl.
CPC ......... *B60R 16/0215* (2013.01); *B60J 7/1607* (2013.01); *B60P 7/0815* (2013.01)

(58) Field of Classification Search
CPC .. B60R 16/0239; B60R 16/0215; B60R 16/03
See application file for complete search history.

(56) References Cited

U.S. PATENT DOCUMENTS

| | | | | | |
|---|---|---|---|---|---|
| 3,006,487 | A | * | 10/1961 | Gelli | B60R 5/04 414/522 |
| 4,993,088 | A | * | 2/1991 | Chudik | A47C 17/80 5/118 |
| 5,905,356 | A | | 5/1999 | Wells | |
| 6,596,941 | B2 | | 7/2003 | Tripoli | |
| 7,048,320 | B2 | | 5/2006 | Rubel et al. | |
| 8,482,250 | B2 | * | 7/2013 | Soar | H01F 38/14 320/108 |
| 10,583,962 | B2 | | 3/2020 | Brunner et al. | |
| 10,703,534 | B2 | | 7/2020 | Brunner et al. | |
| D895,966 | S | | 9/2020 | Brunner et al. | |

(Continued)

FOREIGN PATENT DOCUMENTS

| | | | |
|---|---|---|---|
| CN | 1768721 A | 5/2006 | |
| CN | 108964385 A | 12/2018 | |
| CN | 110576810 A | * 12/2019 | ............. B60R 16/03 |

OTHER PUBLICATIONS

US 10,947,009 B2, 03/2021, Brunner et al. (withdrawn)

*Primary Examiner* — Patricia L Engle
(74) *Attorney, Agent, or Firm* — Vichit Chea; Carlson, Gaskey & Olds, P.C.

(57) ABSTRACT

A power routing system includes a base plate having a surface to support an accessory, a power source configured to provide power to the accessory, the power source having at least one first power outlet, and a power connection member mounted to the base plate. The power connection member includes at least one second power outlet. An adaptor is associated with the power source such that an electrical connector can connect the at least one first power outlet to the power connection member to power the accessory via the at least one second power outlet.

24 Claims, 9 Drawing Sheets

(56)  References Cited

U.S. PATENT DOCUMENTS

| D895,967 S | 9/2020 | Brunner et al. | |
| D896,517 S | 9/2020 | Brunner et al. | |
| D896,518 S | 9/2020 | Brunner et al. | |
| D897,103 S | 9/2020 | Brunner et al. | |
| D898,320 S | 10/2020 | Brunner et al. | |
| 10,962,218 B2 | 3/2021 | Plato et al. | |
| 10,981,696 B2 | 4/2021 | Brunner et al. | |
| D917,977 S | 5/2021 | Brunner et al. | |
| D918,584 S | 5/2021 | Brunner et al. | |
| D919,296 S | 5/2021 | Brunner et al. | |
| 11,008,136 B2 | 5/2021 | Brunner et al. | |
| D920,671 S | 6/2021 | Brunner et al. | |
| 11,027,883 B1 | 6/2021 | Brunner et al. | |
| D923,935 S | 7/2021 | Brunner et al. | |
| 11,130,451 B2 | 9/2021 | Viniegra | |
| 11,192,690 B1 | 12/2021 | Brunner et al. | |
| 11,268,691 B2 | 3/2022 | Plato et al. | |
| 11,365,026 B2 | 6/2022 | Brunner et al. | |
| 11,427,382 B2 | 8/2022 | Brunner et al. | |
| 11,465,805 B2 | 10/2022 | Brunner et al. | |
| 11,492,836 B2 | 11/2022 | Salter et al. | |
| 2020/0079243 A1* | 3/2020 | Bork | B60R 21/207 |
| 2021/0025216 A1* | 1/2021 | Salter | H02G 3/22 |
| 2022/0212587 A1* | 7/2022 | Salter | B60N 2/002 |
| 2023/0116745 A1* | 4/2023 | Salter | B60P 7/10 |
| | | | 248/542 |
| 2024/0262304 A1* | 8/2024 | Rutman | B60R 16/03 |

* cited by examiner

ACCESSORY BASE PLATE WITH POWER CONNECTION ROUTING

TECHNICAL FIELD

This disclosure relates generally to a base plate that secures accessories within a cargo or work area and, more particularly, to a base plate system that includes power connection routing to supply power to accessories that are supported by the base plate.

BACKGROUND

Vehicles transport various types of cargo. A user can, for example, rely on a vehicle to transport accessories, such as containers and tools, to and from a jobsite. The accessories that are transported can vary based on the tasks the user performs at the jobsite. Some accessories may require power.

SUMMARY

In some aspects, the techniques described herein relate to a power routing system, including: a base plate that includes a surface to support an accessory; a power source configured to provide power to the accessory, the power source having at least one first power outlet; a power connection member mounted to the base plate, wherein the power connection member includes at least one second power outlet; and an adaptor associated with the power source such that an electrical connector can connect the at least one first power outlet to the power connection member to power the accessory via the at least one second power outlet.

In some aspects, the techniques described herein relate to a power routing system, wherein the base plate is movable relative to a fixed structure between a retracted position and an extended position, and wherein the power connection member is fixed for movement with the base plate.

In some aspects, the techniques described herein relate to a power routing system that includes a power panel mounted on the fixed structure, wherein the power panel includes the at least one first power outlet that receives power from the power source and a cover plate that is movable between an open position to provide access to the at least one first power outlet and a closed position to cover the at least one first power outlet, and wherein the cover plate is resiliently biased to the closed position.

In some aspects, the techniques described herein relate to a power routing system, wherein the cover plate includes a retaining feature that facilitates holding the adaptor against the power panel when the cover plate is in the open position, and wherein the adaptor comprises a housing with an internal cavity, wherein an outer wall surface of the housing includes a shoulder that is associated with the retaining feature of the cover plate.

In some aspects, the techniques described herein relate to a power routing system that includes a power panel mounted on the fixed structure, wherein the power panel includes the at least one first power outlet that receives power from the power source, and wherein the adaptor comprises a housing with an internal cavity defined at least by a rear wall and a front wall that are connected to each other by first and second side walls, and wherein the rear wall includes an opening that is aligned with the at least one first power outlet, and wherein the electrical connector comprises a cord that is connected to a plug that is located within the internal cavity and is connected to the at least one first power outlet.

In some aspects, the techniques described herein relate to a power routing system, wherein one of the first and second side walls includes an opening through which the cord extends to connect to the power connection member.

In some aspects, the techniques described herein relate to a power routing system, wherein one of the first and second side walls includes a removable portion that is selectively removable to provide access to the internal cavity.

In some aspects, the techniques described herein relate to a power routing system, wherein the front wall includes an additional power outlet that is powered via the power source.

In some aspects, the techniques described herein relate to a power routing system, wherein the rear wall includes a seal that surrounds the opening.

In some aspects, the techniques described herein relate to a power routing system, wherein the front wall is non-perpendicular to the surface of the base plate.

In some aspects, the techniques described herein relate to a power routing system that includes a connection tower that is mounted on the fixed structure at a location that is above the base plate, and wherein the connection tower provides a connection support interface for the electrical connector to connect to a coiled power cord that is connected to the power connection member.

In some aspects, the techniques described herein relate to a power routing system, wherein an opposite end of the cord from the plug is connected to a locking connector that is received within a locking receiver that is associated with the connection tower, and wherein the locking receiver is connected to the coiled power cord that connects to the power connection member such that the locking connector and locking receiver remain in a fixed position relative to the base plate while the coiled power cord coils and uncoils in response to movement of the base plate relative to the fixed structure.

In some aspects, the techniques described herein relate to a power routing system that includes: a first track structure configured to extend along one side of a vehicle cargo area; a second track structure configured to extend along an opposite side of the vehicle cargo area; and the base plate having a first edge and a second edge opposite of the first edge, wherein the first edge is supported by the first track structure and the second edge is supported by the second track structure such that the base plate slides along the first track structure and the second track structure to move between the extended position and the retracted position.

In some aspects, the techniques described herein relate to a power routing system, wherein the base plate includes a plurality of power interface locations configured to interface with an accessory, and wherein each power interface location includes an inductive charging member configured to interface with an inductive charging member on the accessory, and wherein inductive charging members on the base plate are charged via the power source.

In some aspects, the techniques described herein relate to a power routing system, wherein the power connection member includes one or more connectors connected to a wiring harness for the inductive charging members that are associated with the base plate such that the inductive charging members for the base plate can receive power from the power source via the power connection member.

In some aspects, the techniques described herein relate to a power routing system, wherein the power connection member includes a bottom wall, a first set of side walls extending up from one set of opposing edges of the bottom wall, a second set of side walls extending up from another set of opposing edges of the bottom wall and connecting the first set of side walls to each other, and a cover that is movable between an open position and a closed position to define an internal cavity in which the at least one first power outlet is located, and wherein the one or more connectors extend outwardly of the bottom wall, and wherein one of the first and second sets of side walls includes an opening through which an accessory electrical connector can extend to connect the accessory to the at least one second power outlet.

In some aspects, the techniques described herein relate to a power routing system, wherein the base plate is mounted within a vehicle cargo area and includes a plurality of mounting apertures configured to receive one or more cleats associated with the accessory.

In some aspects, the techniques described herein relate to a power routing system, including: a base plate mounted with a vehicle cargo area to provide a surface to support at least one accessory, wherein the base plate includes a plurality of mounting apertures to receive one or more cleats associated with the at least one accessory; a first track structure configured to extend along one side of the vehicle cargo area; a second track structure configured to extend along an opposite side of the vehicle cargo area, wherein the base plate is supported by the first track structure and the second track structure for sliding movement between extended and retracted positions; a power source configured to provide power to the at least one accessory, the power source having at least one first power outlet located in a power panel associated with a vehicle wall that is adjacent to the vehicle cargo area; a power connection member mounted to the base plate for movement with the base plate relative to the vehicle wall, wherein the power connection member includes at least one second power outlet and at least one connector associated with an inductive charging member; and an adaptor associated with the power panel such that an electrical connector assembly can connect the at least one first power outlet to the power connection member such that the power connection member can supply power to the at least one accessory via the at least one second power outlet and/or via the at least one connector.

In some aspects, the techniques described herein relate to a method, the method including: providing a base plate that includes a surface to support an accessory; providing a power source configured to provide power to the accessory, the power source having at least one first power outlet; mounting a power connection member to the base plate, wherein the power connection member includes at least one second power outlet; and connecting the at least one first power outlet to the power connection member via an adaptor and an electrical connector assembly such that power can be provided to the accessory via the at least one second power outlet.

In some aspects, the techniques described herein relate to a method that includes mounting the base plate for sliding movement within a vehicle cargo area between a retracted and extended position, providing a power panel to a fixed vehicle structure adjacent the vehicle cargo area, and mounting the adaptor to the power panel such that the electrical connector assembly can be used to connect the at least one first power outlet to the power connection member.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a base plate that is positioned within a vehicle cargo area and a power routing system that can convey power to accessories that are supported on the base plate. The base plate provides an attachment interface for securing accessories to the vehicle. An adjustment system allows the base plate to be moved between retracted and extend positions, as well as allowing a height of the base plate within the vehicle cargo area to be selectively adjusted. Various types of accessories can be secured to the vehicle through the attachment interface provided by the base plate. Some accessories require power and the power routing system is able to provide power to the accessories on the base plate in all of the different adjustment positions.

Figure 1:
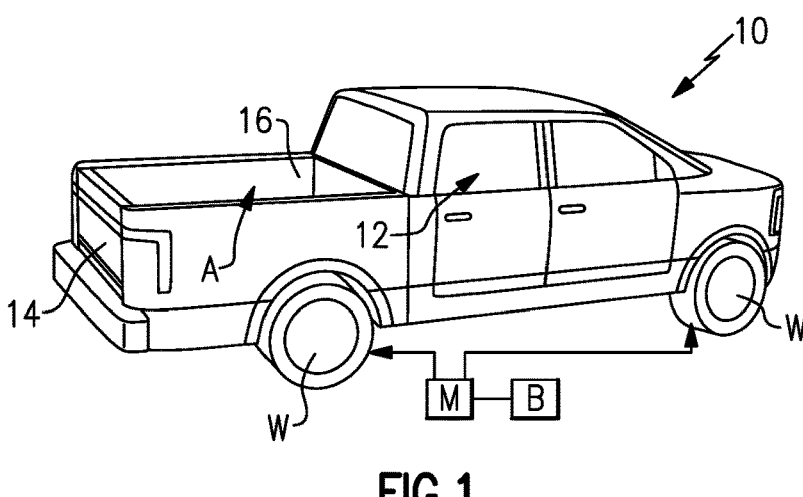
FIG. 1 illustrates a perspective view of a vehicle having a cargo bed that can be equipped with base plates used to secure accessories according to an exemplary aspect of the present disclosure.

FIGS. 1-3F disclose an exemplary embodiments of an adjustable base plate system that interfaces with a track structure within a vehicle cargo area. With reference to FIGS. 1 and 2A-2B, a vehicle 10 includes a passenger compartment 12 and a tailgate 14 that encloses one end of a cargo bed 16 that is aft of the passenger compartment 12. The cargo bed 16 has a floor/support surface 18 and provides an open cargo area A. In this example, the vehicle 10 is a pickup truck. However, the vehicle 10 could be another type of vehicle in another example, such as a car, van, sport utility vehicle, etc. that has a support surface 18 for a cargo area.

In one example, the vehicle 10 is an electrified vehicle and, in particular, a battery electric vehicle (BEV). In another example, the vehicle 10 could be another type of electrified vehicle, such as a plug-in hybrid electric vehicle (PHEV), or a conventional vehicle. In another example, the vehicle could have any other type of propulsion system such as an internal combustion engine or alternative fuel based propulsion system, for example.

In particular, for an electrified vehicle application, the example vehicle 10 includes an electrified powertrain capable of applying a torque from an electric machine M (e.g., an electric motor) to drive a least one set of wheels W. The vehicle 10 can include a traction battery pack B, which powers the electric machine M and, potentially, other electrical loads of the vehicle 10.

Various accessories and/or modules 22 can be secured to the vehicle 10 by engaging one or more of the base plates 20. The accessories/modules 22 can comprise a lockable storage box that holds tools, a refrigerator, etc. The accessory 22 could also be a lidded lockable container that includes a compartment for storing power tools or other items that require power or data connection. Or, the accessories 22 could comprise power tools that are directly supported on the base plate 20.

The accessories 22 can engage one or more of the base plates 20 using an attachment system. In the exemplary embodiment, the attachment system includes a plurality of mounting apertures 24 and at least one cleat or foot 26 that cooperate to provide a mechanical connection interface. The base plate 20 is supported within the cargo area A via an additional support interface that is separate from the mechanical connection interface for the accessories 22. In one example, the additional support interface comprises a track assembly.

In one example, the base plates 20 provide the mounting apertures 24 and the accessories 22 include a plurality of cleats or feet 26. This could be rearranged, however, such that one or all of the cleats/feet 26 extend from the base plates 20 and the accessories 22 provide some or all of the mounting apertures 24.

Figure 2A:
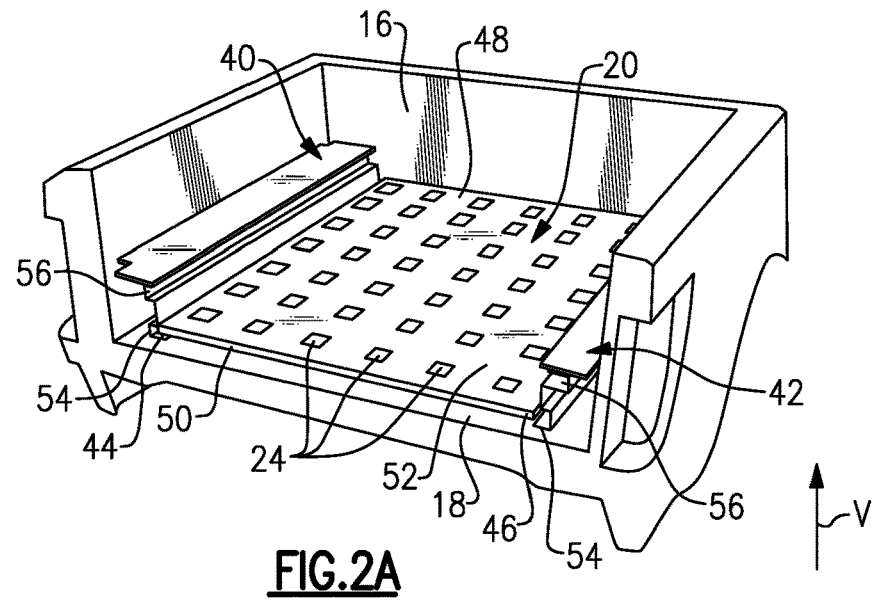
FIG. 2A is a perspective view of an adjustable base plate mounting system for a cargo bed, where the mounting system comprises a track.
Figure 2B:
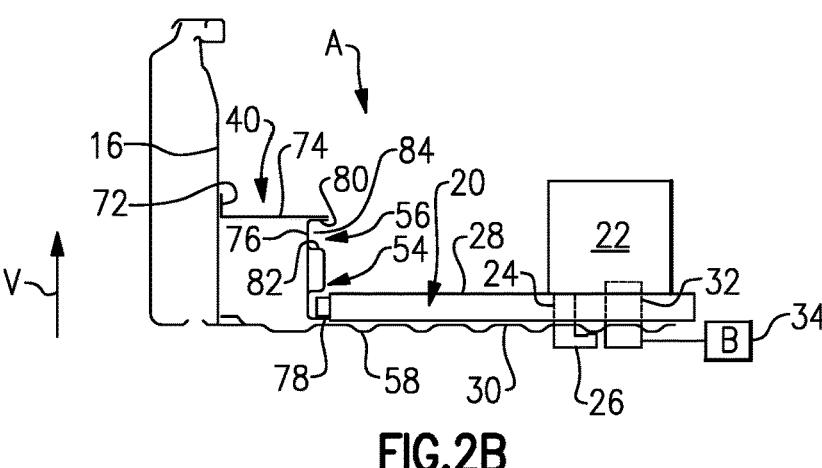
FIG. 2B is a schematic section view of the adjustable base plate mounting system of FIG. 2A.

In the exemplary embodiment, when the base plate 20 and the accessories 22 are engaged, the cleats/feet 26 are each received within one of the mounting apertures 24 such that the cleats/feet 26 each extend from a first side 28 of the base plate 20, through one of the mounting apertures 24, and past an opposite, second side 30 of the base plate 20 as schematically shown in FIG. 2B.

In one example, the accessory 22 comprises a lockable box that is mechanically coupled to the vehicle 10 through the base plate 20. Optionally, the accessory 22 could additionally comprise a lockable box that includes a power interface 32. This would allow devices within the lockable box to be powered from a vehicle power supply 34 such as the battery pack B or 12V vehicle power, for example. The internal device could be a refrigerated container that is powered by the vehicle 10 when the box is engaged with the base plate 20, or the devices within the lockable box could comprise rechargeable tools, which can be recharged when set within the box and coupled to a charging interface between the accessory 22 and the base plate 20. In one example, a power routing system 36 (FIG. 4) is used such that the base plate 20 can be plugged into 12V vehicle power, the battery pack B, or other power sources via a variety of connections/outlets.

In one example, the power interface 32 comprises an inductive power interface where an inductive power generation module is associated with one of the baseplate 20 and the accessory 22 and an inductive power receiver module associated with the other of the baseplate 20 and the accessory 22. In one example, the inductive power generation module is associated with the base plate 20 and communicates with the inductive power receiver module through a power connection aperture 38 formed in the base plate 20. An example of such an inductive power interface is found in application Ser. No. 17/716,053 filed on Apr. 8, 2022, which is assigned to the assignee of the subject application, and which is herein incorporated by reference.

In one example of the subject disclosure, a track assembly is used to mount one or more base plates 20 within a cargo area A. In one example shown in FIG. 2A, the track assembly comprises a first track structure 40 configured to extend along one side of the vehicle cargo area A and a second track structure 42 configured to extend along an opposite side of the vehicle cargo area A. The base plate 20 has a first edge 44 and a second edge 46 opposite of the first edge 44. The first edge 44 is supported by the first track structure 40 and the second edge 46 is supported by the second track structure 42. In one example, the first 44 and second 46 edges extend in a longitudinal direction along a length of the vehicle 10.

As shown in FIG. 2A, the first 44 and second 46 edges are parallel to each other. The base plate 20 also has a third edge 48 and a fourth edge 50 that are parallel and spaced apart from each other. The third 48 and fourth 50 edges connect to the first 44 and second 46 edges such that the base plate 20 comprises a four-sided generally flat and planar mount surface 52 to support the accessories 22.

The subject disclosure provides that the first 40 and second 42 track structures allow the base plate 20 to be mounted at different vertical height levels within the cargo area A. In one example, the first track structure 40 and the second track structure 42 each comprise at least a first tier track 54 and a second tier track 56. In one example, the second tier tracks 56 are spaced apart from respective first tier tracks 54 in a vertical direction V relative to the support surface 18 of the vehicle cargo area A. The base plate 20 can be supported by either the first tier tracks 54 or by the second tier tracks 56 such that a distance between a bottom surface 58 of the base plate 20 and the support surface 18 of the vehicle cargo area can be adjusted.

In FIGS. 2A-B a two-tier track is shown; however, additional tiers could be added as needed such that the distances between the bottom surface 58 of the base plate 20 and the support surface 18 of the vehicle cargo area A can be further varied. Optionally, two or more base plates 20 could be installed at the same time to provide support for a plurality of accessories 22, or to provide a support for accessories 22 within the cargo bed 16 in combination with a cover for the cargo bed 16. In the example shown in FIG. 3F, at least an additional third tier track 60 is provided on each of the first track structure 40 and the second track structure 42. The third tier track 60 is spaced apart from the first 54 and second 56 tier tracks in the vertical direction V. In one example, when the base plate 20 is installed on the third tier track 60, the base plate serves as a tonneau cover 62 that encloses the vehicle cargo area A.

Figures 3A, 3B, 3C, 3D, 3E, 3F:
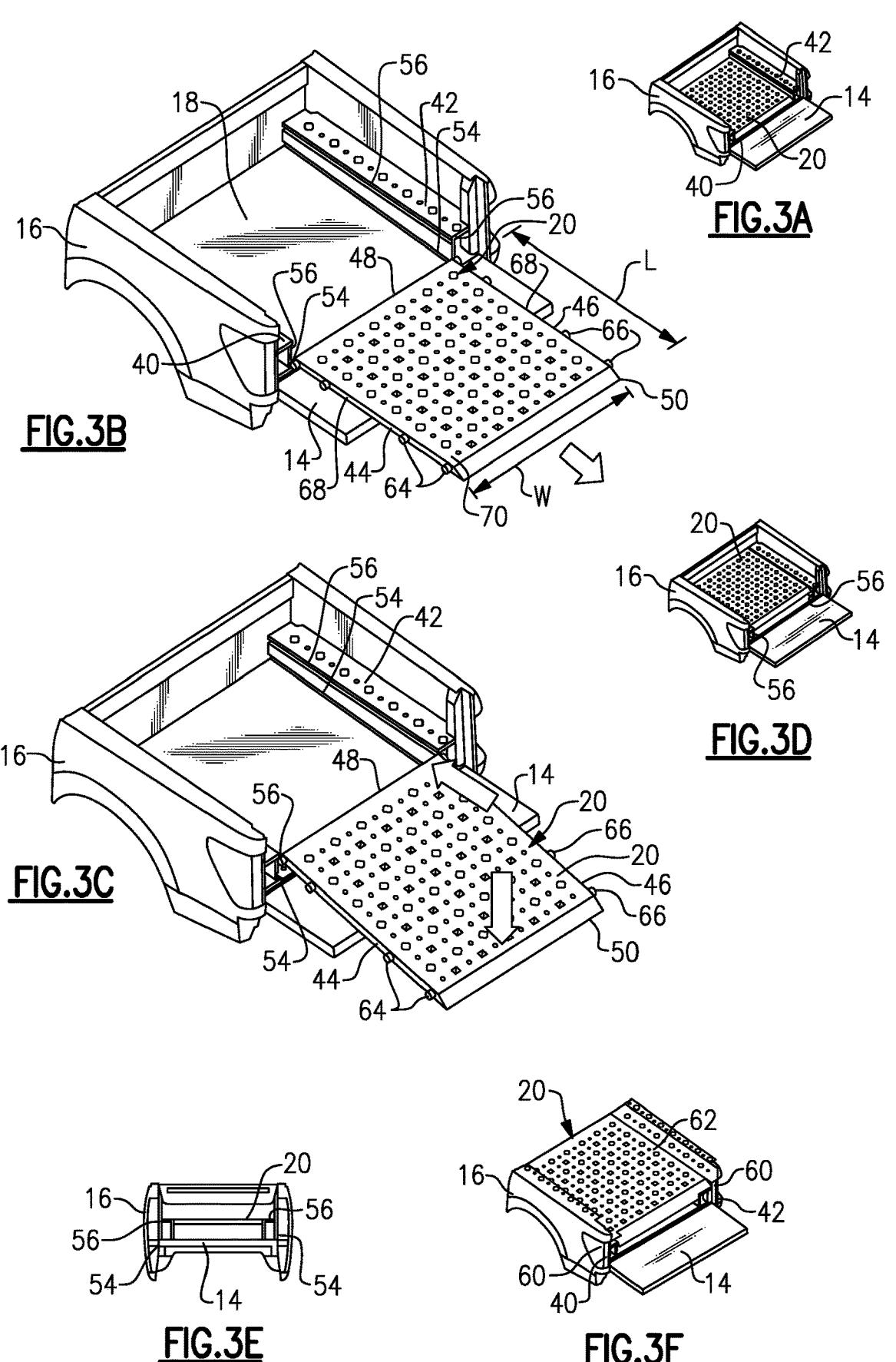
FIG. 3A is a perspective view of an adjustable base plate mounting system with the base plate in a fully installed position on a lower tier of the track.
FIG. 3B is a view similar to FIG. 3A but showing that the base plate can be extended outwardly of the cargo bed for removal.
FIG. 3C is a view similar to FIG. 3A but shows the base plate pivoting from the lower tier of the track to an upper tier of the track.
FIG. 3D is a view similar to FIG. 3A but shows the base plate fully installed on the upper tier of the track.
FIG. 3E is an end view of FIG. 3D.
FIG. 3F is a perspective view with the track including an additional upper tier such that the base plate can be used as a cover for the cargo bed.

By installing the base plate 20 on the second tier track 56, the base plate 20 is vertically higher than when the base plate 20 is supported by the first tier track 54. This increases the available cargo area between the bottom surface 58 of the base plate 20 and the support surface 18 of the cargo area A. Additionally, the support surface 18 is free from any base plate support structures between the first track structure 40 and the second track structure 42 as shown in FIG. 3E. This further increases available cargo area and also allows for the base plates to be completely removed from the vehicle such that the support surface 18 can receive large, tall items such as furniture, large boxes, etc.

In one example, the edges 44, 46 of the base plate 20 include low-friction members that allow the base plate 20 to be easily moved along the first 54 and second 56 tier tracks such that the base plate 20 can be switched between the two different height levels. In one example, a first set of sliders or rollers 64 are positioned on the first edge 44 of the base plate 20 and a second set of sliders or rollers 66 are positioned on the second edge 46 of the base plate 20. The first 64 and second 66 sets of rollers are respectively spaced apart from each other in the longitudinal direction along the first 44 and second 46 edges of the base plate 20. In one example, the first 64 and second 66 sets of rollers extend outwardly of the first 44 and second 46 edges of the base plate 20 in the lateral direction. In one example, the rollers comprise axles that are fixed to the base plate edges with roller elements supported on the axles to independently rotate about a respective axis of the axles.

In one example, the first track structure 40 and the second track structure 42 are steel, roll-formed structures that are mounted to sides of the cargo bed 16 and/or to outermost edge portions of the support surface 18. In one example, the first 40 and second 42 track structures have a cross-section that comprises a first flange 72 extending in the vertical direction, a first or upper plate 74 that extends from the first flange 72 to a second or side plate 76, and a second flange 78 that extends from the side plate 76 in a lateral direction. The first plate 74 extends in the lateral direction and the second plate 76 extends in a vertical direction. The first flange 72 is attached to a side surface of the cargo bed 16 and the second flange 78 is attached to the support surface 18. The first 54 and second 56 tier tracks are formed within the side plate 76. In one example, the first 54 and second 56 tier tracks comprise an upper surface 80, a lower surface 82, and a side surface 84 that extends between the upper 80 and lower 82 surfaces to form a C-shape or U-shape. The open cross-section of the C-shape or U-shape is open in a direction that faces the cargo area A.

FIG. 3A shows the base plate in a fully installed position on the lower tier track 54. To change the position of the base plate 20, the fourth edge 50, e.g. a rearward edge, of the base plate 20 is moved at least partially outwardly of the vehicle cargo area A via the first 64 and second 66 sets of rollers along the first tier track 54 as shown in FIG. 3B. The base plate 20 is then removed from the first tier track 54 and is installed on the second tier track 56. Optionally, the base plate 20 can be completely removed from the cargo area A as needed.

In one example, the base plate 20 is moved in a rearward direction along the lower tier track 54 such that a rearward end of the base plate 20 extends outwardly of the vehicle cargo area, and then the rearward end of the base plate 20 is pivoted downward to move a forward end 48 of the base plate 20 in an upward direction to the upper tier track 56 as shown in FIG. 3C. Finally, the forward end of the base plate 20 is then moved in a forward direction to install the base plate 20 on the upper tier track 56 as shown in FIGS. 3D-E. FIG. 3E shows how much the cargo area underneath the base plate 20 is increased by moving to the upper tier. FIG. 3F shows the base plate installed on an additional upper tier track 60 to provide the option of a cover 62.

In one example, a handle is used to move the base plate 20 between the extended and retracted positions. Additionally, a locking mechanism can be used to lock the base plate 20 in a desired adjustment position. An example of a handle and locking mechanism is found in application Ser. No. 17/886,663 filed on Aug. 12, 2022, which is assigned to the assignee of the subject application, and which is herein incorporated by reference.

Figure 4:
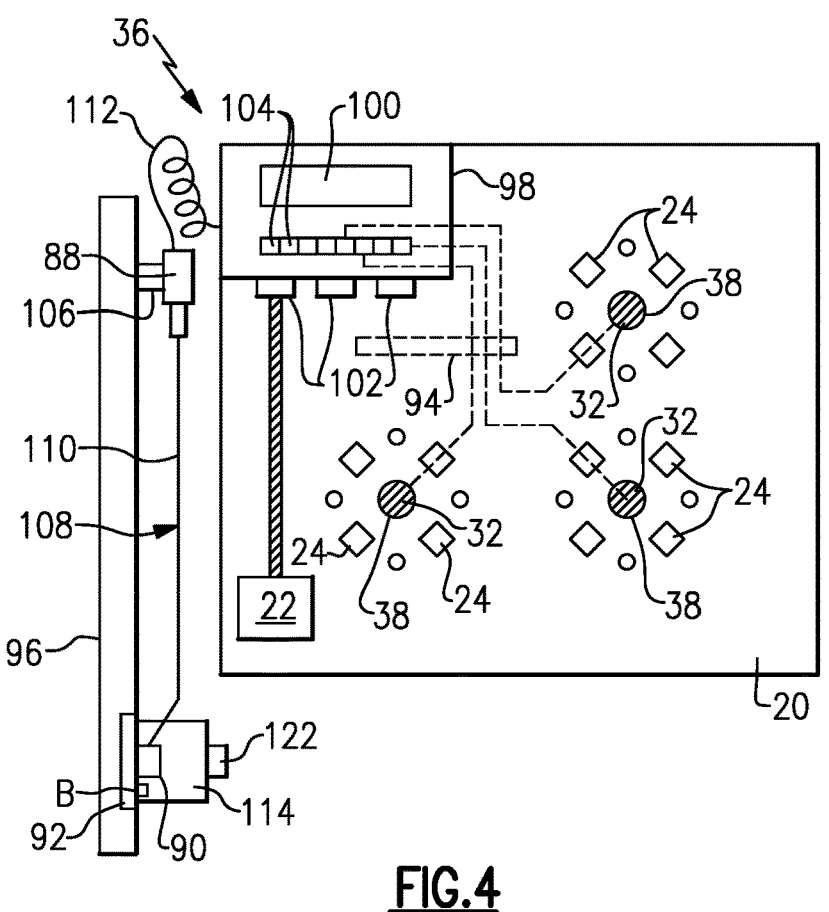
FIG. 4 is a schematic view of a power connection routing system to route power from a power source to an accessory mounted on the base plate.

FIG. 4 shows a schematic example of the power routing system 36 as incorporated within the vehicle 10. The power routing system 36 is used to supply power from a vehicle power source to accessories 22 associated with the base plate 20 in a way that can accommodate movement of the base plate 20 between the various adjustment positions. The power routing system 36 routes wiring along the cargo area A such that 120 VAC power from at least one vehicle power outlet 90 of a vehicle power panel 92 can be communicated to 12V wireless charging power interfaces 32 associated with the base plate 20. In one example, the vehicle power panel 92 is located in a side wall 96 of the truck bed.

A power connection box 98 is mounted to a rear portion of the sliding accessory base plate 20. The power connection box 98 includes an AC/DC transformer 100, 120 VAC power outlets 102 to connect to accessories 22, and one or more connectors 104 to be associated with the inductive charging power interface 32. One of ordinary skill in the art would understand how to connect the inductive charging power interface 32 to the AC/DC transformer 100 via a wiring harness 94, for example.

Figure 9:
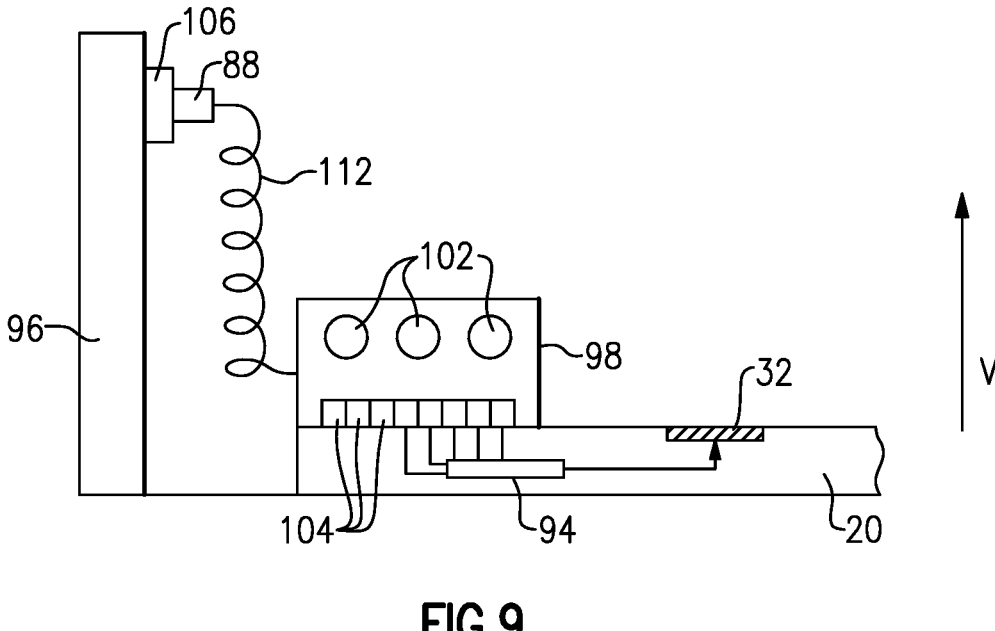
FIG. 9 is a schematic view of a connection tower used to connect the electrical connector from the vehicle power panel to the coiled power cord that is connected to the power connection box.

A tower structure 106 is mounted to the side wall 96 of the truck bed above the sliding accessory base plate 20 as shown in FIG. 9. An electrical connector assembly 108 (FIG. 4) connects the power panel 92 to the power connection box 98. The electrical connector assembly 108 includes a first connector 110 that connects the power panel 92 to the tower structure 106 and a second connector 112 that connects the tower structure 106 to the power connection box 98. In one example, the tower structure 106 is fixed to a forward end of the side wall 96 of the truck bed at a location that is high enough such that the second connector 112 is free to move with the base plate 20 without any interference. In one example, the tower structure 106 comprises a bracket or box structure that provides a support/mounting location for a connector interface 88 that is used to connect the first connector 110 to the second connector 112.

Figure 5:
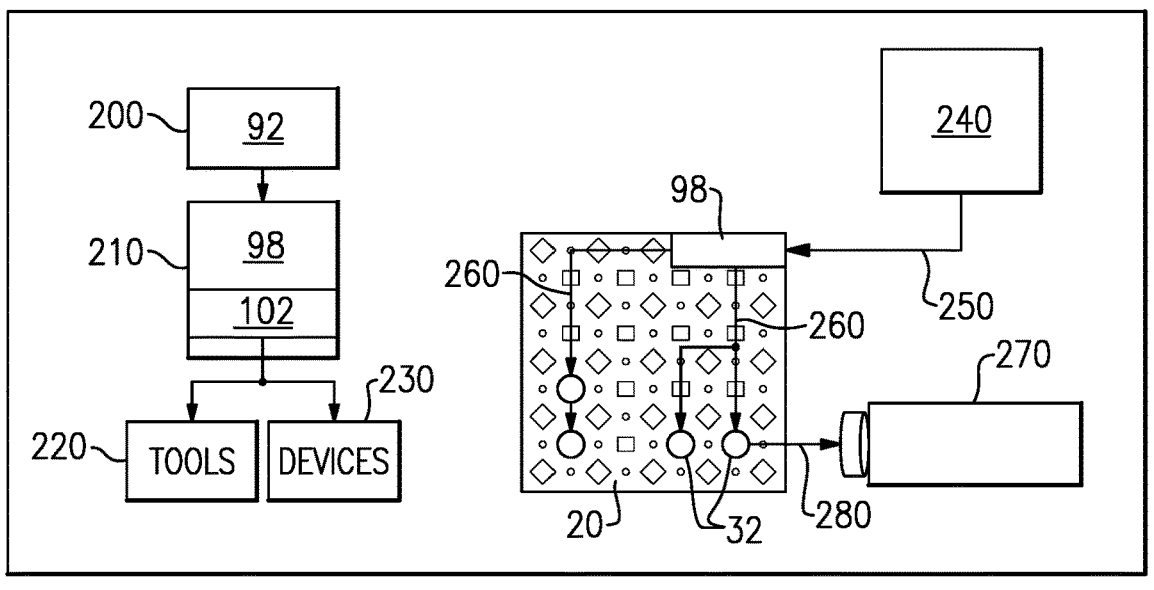
FIG. 5 is schematic diagram illustrating power being supplied to the base plate.

FIG. 5 is schematic diagram illustrating power distribution to the base plate 20. The vehicle is equipped with a power on board feature that provides electricity to the vehicle power panel 92. Certain vehicles are powered by a battery pack as discussed above, and if the battery pack is at full charge, power to onboard systems can be supplied via the battery pack. In other vehicles, 12V power from a vehicle battery is available. If the batteries run low on power, the vehicle can be started to recharge the battery pack and to continue to supply power to any power outlets. The system can be configured to provide a specified wattage to power outlets in a passenger cabin and/or in the cargo bed area. In one example, a button B on the power panel can be pressed to turn on the bed outlets. Optionally, outlets can be activated via a control panel or touchscreen, for example.

In the example shown in FIG. 5, onboard 120 VAC output is supplied at the power panel 92 as indicated at step 200. This power is transferred to the power connection box 98 as indicated at step 210. The power connection box 98 includes 120V outlets 102, for example. These outlets 102 can then be used to charge tools, as indicated at step 220, or can be used to power other devices/accessories, as indicated at step 230.

Additionally, a vehicle power supply 240, from a high voltage battery pack and/or a 12V vehicle battery for example, is connected to the power connection box 98 as indicated at 250. Connectors 104 in the power connection box 98 are associated with the inductive charging power interface 32 as indicated at 260. A smart accessory 270 can then interface with the inductive charging power interface 32, as indicated at 280, to receive power as needed.

Figure 6:
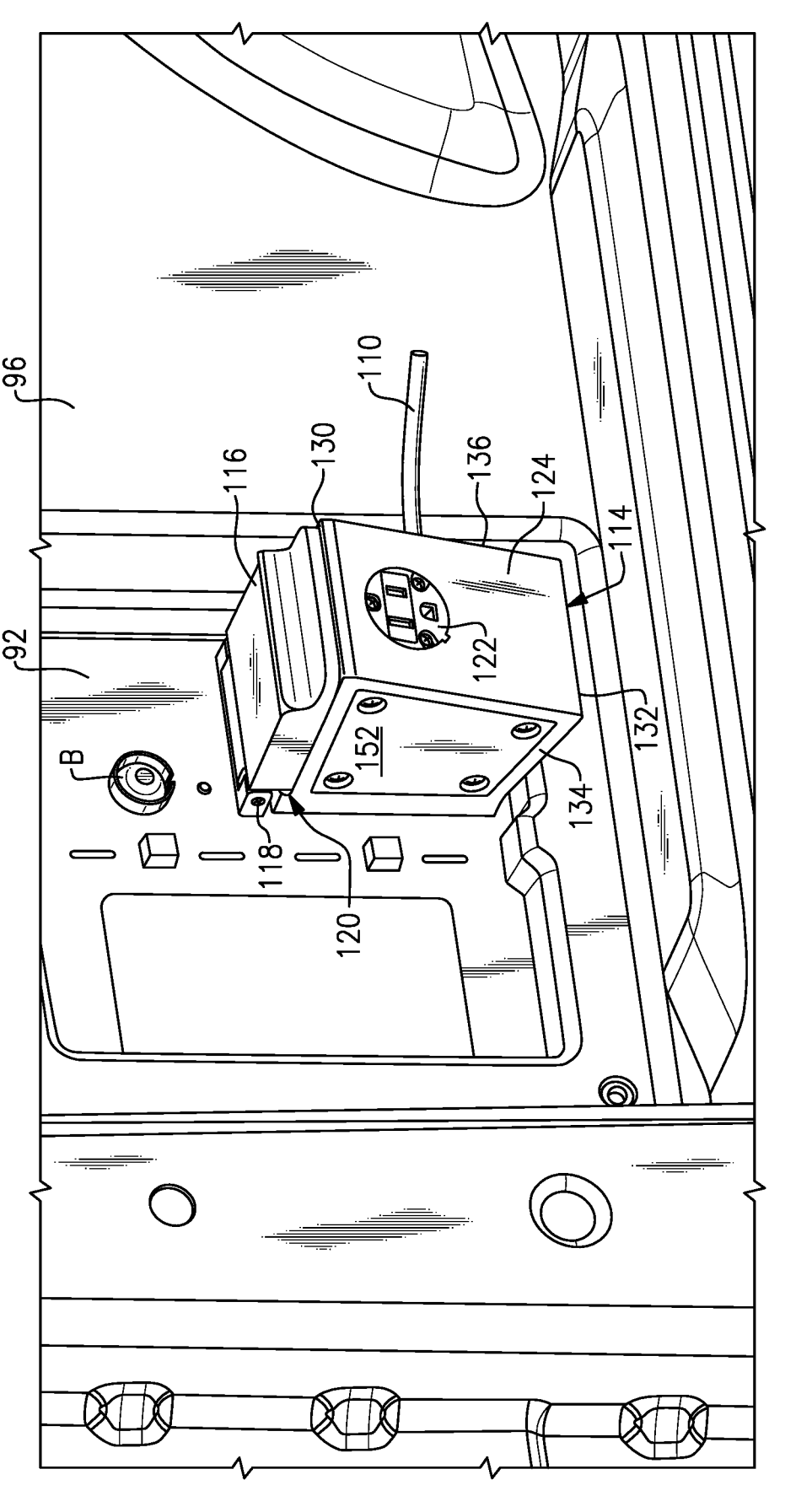
FIG. 6 is a perspective view of an adaptor used to connect power from a vehicle side power panel to a power connection box associated with the base plate.

In one example, an adaptor 114 is mounted to the power panel 92 as shown in FIG. 6. In one example, the power panel 92 includes one or more vehicle power outlets 90 (FIG. 8A) that are covered by a cover plate 116 that is movable between an open position (FIG. 6) to provide access to the power outlet 90 and a closed position to cover the power outlet 90. In one example, the cover plate 116 is resiliently biased to the closed position by resilient member, e.g. a spring, that is associated with a pivot shaft 118. The cover plate 116 is moved to an open position and the adapter 114 is fit underneath the cover plate 116 such that a top of the adaptor 114 is resiliently retained by the cover plate 116 via a snap/retaining interface 120 (see FIGS. 8A-8B).

In one example, the power panel 92 includes a button 168 (FIG. 8A) that is depressed when the cover plate 116 is in the closed position. When the cover plate 116 is moved to the open position, the button 168 is released and a signal is sent to indicate that the cover plate 116 is open and something could be plugged into the power panel 92. In one example shown in FIG. 8A, the adapter 114 also keeps the button 168 depressed such that messages will not be sent that the cover plate 116 is open.

In one example, the adaptor 114 also has an additional outlet 122 on a forward wall 124 to replace the outlet 90 that is covered up by the adaptor 114.

Figure 7B:
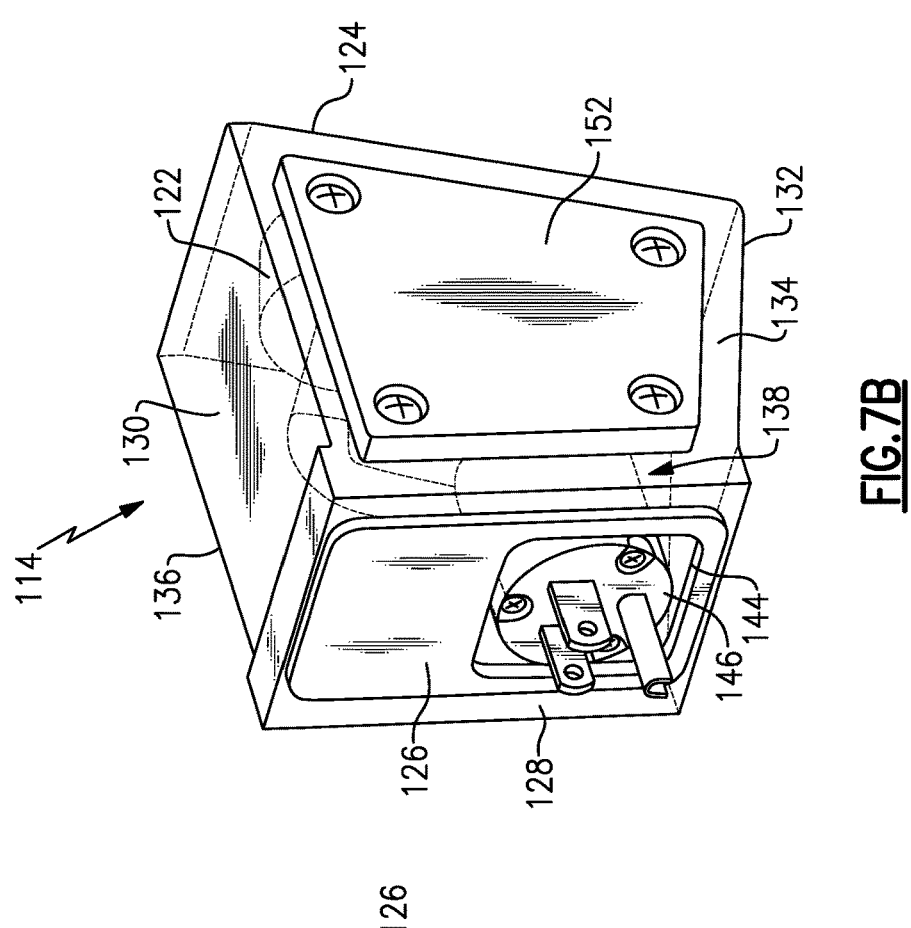
FIG. 7B is a rear perspective view of the adaptor of FIG. 7A from an opposite side.
Figure 7A:
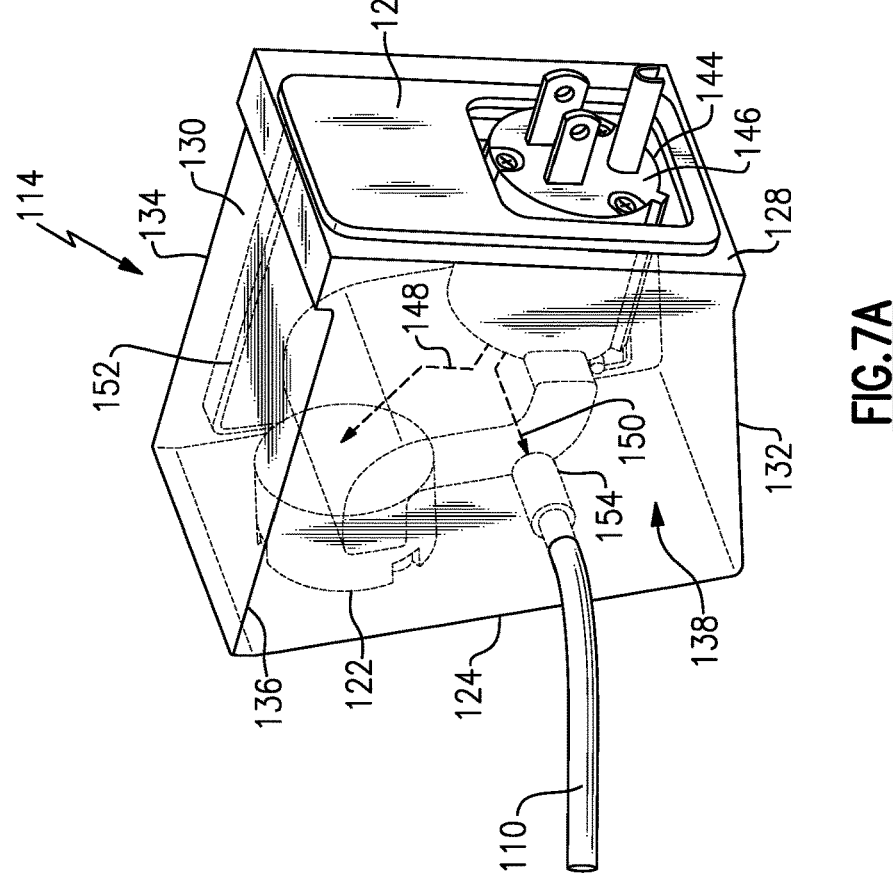
FIG. 7A is a rear perspective view of the adaptor from one side.

In one example shown in FIGS. 7A-7B, a seal 126 is provided around the adaptor 114 to seal the outlet 90 from weather/debris. Additionally, in one example, the forward wall 124 of the adaptor 114 is angled, i.e. non-perpendicular to the surface of the base plate 20, so that water will not enter the electrical outlet 122.

As shown in FIGS. 6, 7A-B, and 8A-B, the adaptor 114 comprises the forward wall 124, a rear wall 128, a top wall 130, a bottom wall 132, and side walls 134, 136. These walls (124, 128, 130, 132, 134, and 136) form a box-like housing that encloses an internal cavity 138. In one example, the top wall 130 includes a shoulder 140 (FIGS. 8A-B) that is resiliently gripped by a flange 142 on the cover plate 116 when the cover plate 116 is in the open position. This interface comprises the snap/retaining interface 120 that facilitates holding the adaptor 114 against the power panel 92 when the cover plate 116 is in the open position.

In one example, the rear wall 128 includes an opening 144 that is aligned with the power outlet 90. The seal 126 is positioned to completely surround the opening 144 to provide a seal interface between the adaptor 114 and the power panel 92. In one example, the seal 126 is made from a rubber or other similar material.

Figures 8A, 8B:
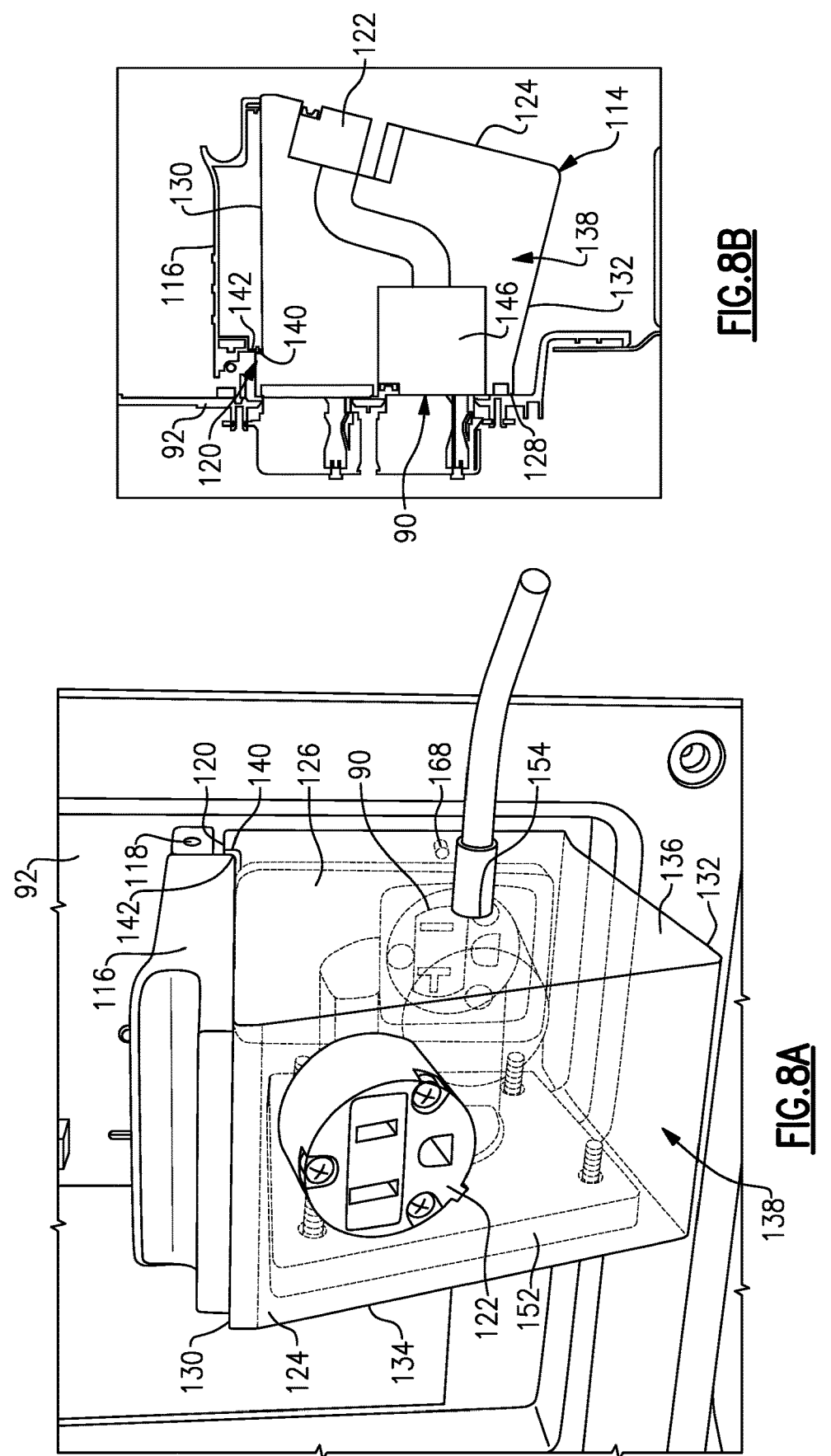
FIG. 8A is a front perspective view of the adaptor as installed in the vehicle power panel.
FIG. 8B is a side section view of the adaptor of FIG. 8A.

As discussed above, the electrical connector assembly 108 includes a first electrical connector 110 that connects the power panel 92 to the tower structure 106 and a second electrical connector 112 that connects the tower structure 106 to the power connection box 98. In one example, the first electrical connector 110 comprises a cord that having a first end that is associated with a plug 146 that is located within the internal cavity 138. The plug 146 is connected to the power outlet 90 in the power panel 92 as shown in FIG. 8B. The plug 146 provides power to the additional outlet 122 as schematically shown at 148 and provides power to the cord comprising the first electrical connector 110 as schematically shown at 150 in FIG. 7A. The wiring used to provide these connections at 148 and 150 is not shown for purposes of clarity. In one example, one of the side walls 134, 136 includes a removable portion 152 that is selectively removable to provide access to the internal cavity 138 for the purposes of wiring. Those skilled in the art who have the benefit of this description will be able to determine how to use wiring to transfer power from the outlet 90 to the additional outlet 122 and to the first electrical connector 110.

Figure 10:
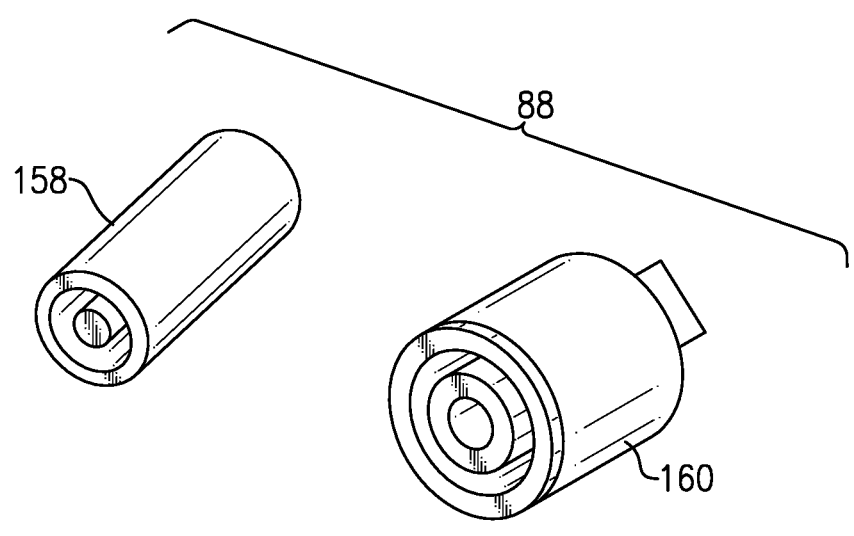
FIG. 10 is a perspective view of a connector that connects the electrical connector to the coiled power cord.

In one example, one of the side walls 134, 136 includes an opening 154 through which the cord of the first electrical connector 110 extends to connect to the power connection box 98. In one example, the first electrical connector 110 extends to a second end 156 that is coupled to the connector interface 88 that is fixed to the tower structure 106 as described above. In one example shown in FIG. 10, the connector interface 88 comprises a locking connector 158 and a locking receiver, such as a socket 160 for example, that are used to electrically connect the first electrical connector 110 to the second electrical connector 112. The locking connector 158 is connected to the second end 156 of the cord of the first electrical connector 110 and the socket 160 is connected to a first end 162 of the second electrical connector 112. Optionally, the positions of the locking connector 158 and socket 160 could be reversed. While a locking connector/socket is shown in FIG. 10, other types of connector interfaces 88 could also be used such as latching connectors or other types of connectors/receivers, for example.

In one example, the second electrical connector 112 comprises a coiled power cord. The first end 162 of the coiled power cord is connected to the socket 160 and a second end 164 of the coiled power cord is connected to the power connection box 98. The cord of the first electrical connector 110 remains in a fixed position relative to the base plate 20 while the coiled power cord of the second electrical connector 112 coils and uncoils in response to movement of the base plate 20 relative to the tower structure 106. As such, the connector interface 88 is used to transfer power from a top of the tower structure 106 down to the AC/DC transformer 100 in the power connection box 98. As discussed above, the tower structure 106 is fixed to the side wall 96 at a location that is high above the base plate 20 such that nothing interferes with the coiled power cord during movement of the base plate 20 between adjustment positions.

Figure 12A:
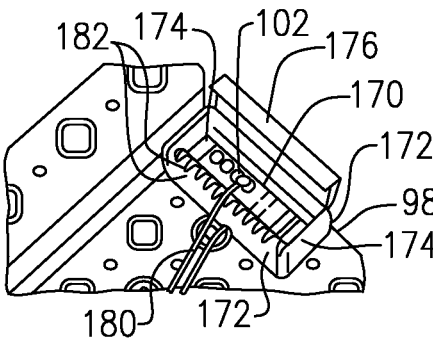
FIG. 12A is a perspective top view of one example of the power connection box in an open position.

The power connection box 98 is fixed for movement with the base plate 20 as the base plate 20 moves between the retracted and extended positions. In one example shown in FIGS. 12A-B, the power connection box 98 includes a bottom wall 170, a first set of side walls 172 extending up from one set of opposing edges of the bottom wall 170, and a second set of side walls 174 extending up from another set of opposing edges of the bottom wall 170. The second set of side walls 174 connect the first set of side walls 172 to each other. The bottom wall 170 and side walls 172, 174 form a box-shape with an open internal cavity. In one example, a cover 176 is mounted on the power connection box 98 to be movable between an open position and a closed position. In one example, the power outlets 102 are located within the internal cavity and are protected when the cover 116 is in the closed position. The power outlets 102 could be moved to one of the side walls 172, 174 as shown in FIGS. 4 and 9.

Figure 12B:
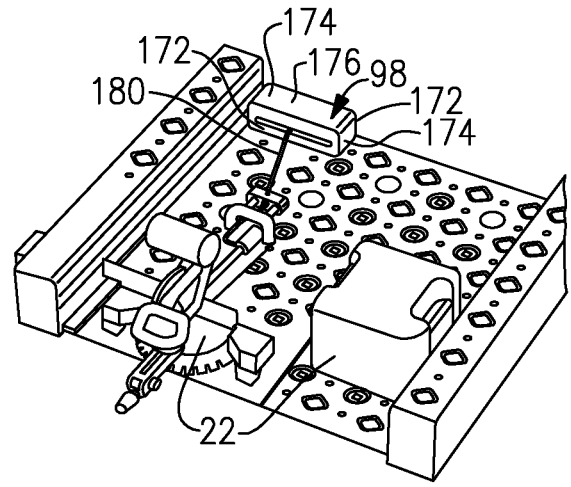
FIG. 12B is a perspective top view showing an accessory connected to the power routing system.

In one example, an accessory electrical connector 180 can extend from the accessory 22 to the power outlet 102 to connect to the accessory 22 to the vehicle power source (see FIG. 12B). In one example, a plurality of detents or grooves 182 are provided to securely hold the accessory electrical connectors 180 in a gripping manner such that the connectors 180 do not move around relative to the power box 98.

Figure 11:
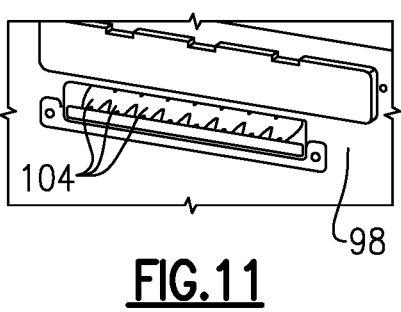
FIG. 11 shows a bottom view of the power connection power connection box with a plurality of connectors associated with inductive charging members.

As discussed above, the power connection box 98 includes one or more connectors 104 that are connected to the wiring harness 94 (FIG. 4) for the inductive charging power interfaces 32 that are associated with the base plate 20. In one example shown in FIG. 11, the connectors 104 extend outwardly of the bottom wall 170 to connect to the wiring harness 94 such that the inductive charging power interfaces 32 for the base plate can receive power from the power panel 92 via the power connection box 98.

In one example, a flexible tower 190 (FIG. 13) can be used in addition to, or in place of, the power connection box 98. In one example, the flexible tower 190 includes a base flange 192, at least one flex arm 194 extending upwardly from the base flange 192, and an attachment plate 196 extending upwardly from the flex arm 194. In one example, one or more power plugs, similar to that shown in FIG. 6, can be mounted to the attachment plate 196 via a fastener attachment interface, for example, such that power can be supplied to an accessory 22 via a power connection interface. In one example, the flexible tower 190 is connected to vehicle supply power in a manner similar to that of the power connection box 98.

Figure 13:
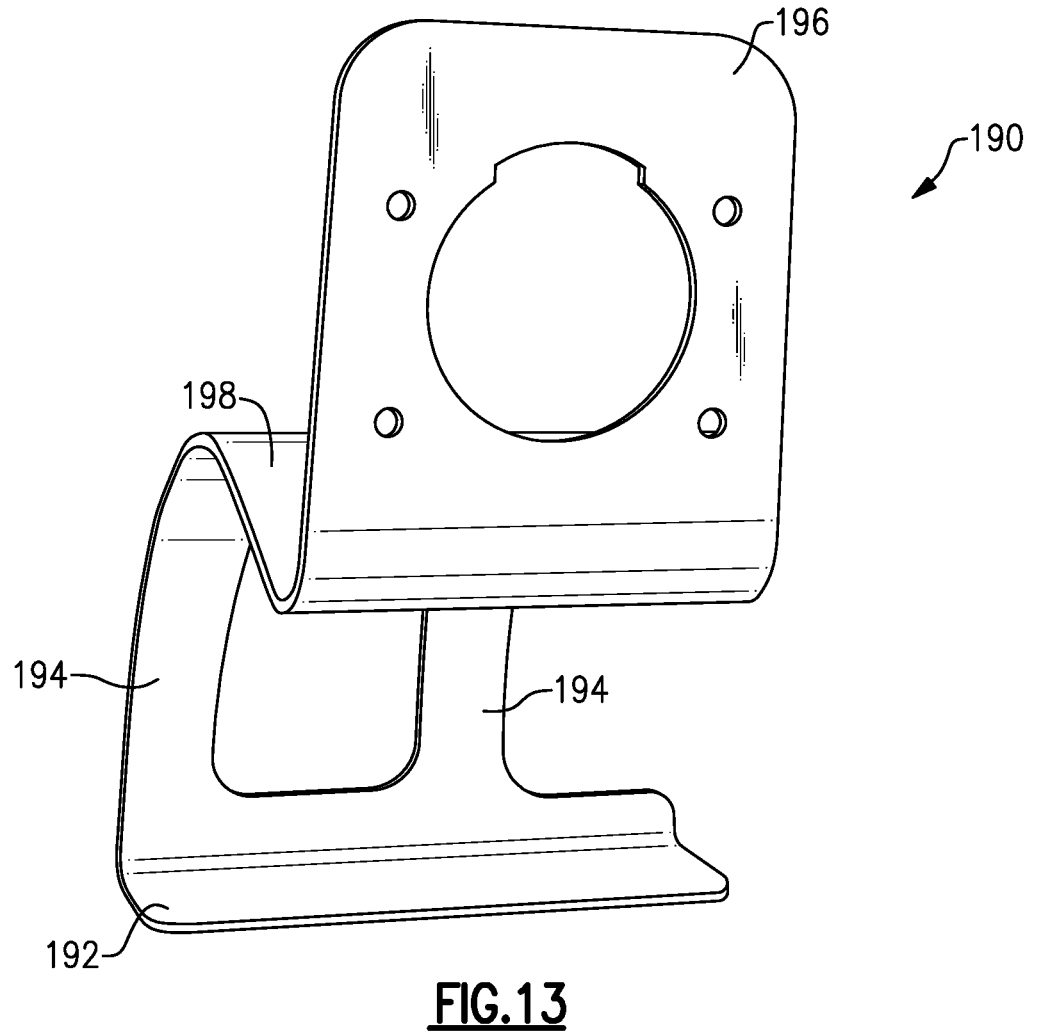
FIG. 13 is a perspective view of another example of a power connection interface.

The base flange 192 can be fixed to the base plate 20 or to a side rail (FIG. 3B) via any type of attachment method, e.g. welding, fastening, etc. In one example, the base flange 192 sits flat against a base plate or side rail surface. As shown in FIG. 13, the at least one flex arm 194 comprises two flex arms 194 that extend upwardly from the base flange 192 with an open area therebetween. The two flex arms 194 then transition into a U-shaped flex hinge portion 198, which then transitions into the attachment plate 96. The flex hinge portion 198 allows the tower 190 to bend or flex at a load input above a predefined resilient limit to accommodate load shifts of equipment or boxes. In one example, the attachment plate 196 comprises a flat surface that extends in a vertical direction with a center opening for the plug.

In one example, a simpler adaptor (not shown) can be used in combination with a traditional plug cord. In this example, the adaptor comprises a foam block that snaps up under the cover plate or extends all the way out the push against the bed slide of the rail assembly. This adaptor does not include an additional outlet.

In summary, the disclosure is directed to a wire routing system for a cargo area having a sliding accessory baseplate such that vehicle power from a power panel can be com-municated to power accessories supported on the base plate or to power charging elements associated with the base plate. An adaptor is connected to the power panel and an electrical connector assembly is used to connect the adaptor to a power connection box mounted for movement with the sliding accessory baseplate. This provides a simple and robust system that can provide power to accessories while also accommodating movement of the base plate.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A power routing system, comprising:
a base plate that includes a surface to support an accessory, wherein the base plate is movable relative to a fixed structure between a retracted position and an extended position;
a power source configured to provide power to the accessory, the power source having at least one first power outlet that is mounted to the fixed structure;
a power connection member mounted to the base plate, wherein the power connection member is fixed for movement with the base plate, and wherein the power connection member includes at least one second power outlet; and
an adaptor associated with the power source such that an electrical connector can connect the at least one first power outlet to the power connection member to power the accessory via the at least one second power outlet.

2. The power routing system of claim 1, including a power panel mounted on the fixed structure, wherein the power panel includes the at least one first power outlet that receives power from the power source and a cover plate that is movable between an open position to provide access to the at least one first power outlet and a closed position to cover the at least one first power outlet, and wherein the cover plate is resiliently biased to the closed position.

3. The power routing system of claim 2, wherein the cover plate includes a retaining feature that facilitates holding the adaptor against the power panel when the cover plate is in the open position, and wherein the adaptor comprises a housing with an internal cavity, wherein an outer wall surface of the housing includes a shoulder that is associated with the retaining feature of the cover plate.

4. The power routing system of claim 1, including a power panel mounted on the fixed structure, wherein the power panel includes the at least one first power outlet that receives power from the power source, and wherein the adaptor comprises a housing with an internal cavity defined at least by a rear wall and a front wall that are connected to each other by first and second side walls, and wherein the rear wall includes an opening that is aligned with the at least one first power outlet, and wherein the electrical connector comprises a cord that is connected to a plug that is located within the internal cavity and is connected to the at least one first power outlet.

5. The power routing system of claim 4, wherein one of the first and second side walls includes an opening through which the cord extends to connect to the power connection member.

6. The power routing system of claim 4, wherein one of the first and second side walls includes a removable portion that is selectively removable to provide access to the internal cavity.

7. The power routing system of claim 4, wherein the front wall includes an additional power outlet that is powered via the power source.

8. The power routing system of claim 4, wherein the rear wall includes a seal that surrounds the opening.

9. The power routing system of claim 4, wherein the front wall is non-perpendicular to the surface of the base plate.

10. The power routing system of claim 4, including a connection tower that is mounted on the fixed structure at a location that is above the base plate, and wherein the connection tower provides a connection support interface for the electrical connector to connect to a coiled power cord that is connected to the power connection member.

11. The power routing system of claim 10, wherein an opposite end of the cord from the plug is connected to a locking connector that is received within a locking receiver that is associated with the connection tower, and wherein the locking receiver is connected to the coiled power cord that connects to the power connection member such that the locking connector and locking receiver remain in a fixed position relative to the base plate while the coiled power cord coils and uncoils in response to movement of the base plate relative to the fixed structure.

12. The power routing system of claim 1, including:
a first track structure configured to extend along one side of a vehicle cargo area;
a second track structure configured to extend along an opposite side of the vehicle cargo area; and
the base plate having a first edge and a second edge opposite of the first edge, wherein the first edge is supported by the first track structure and the second edge is supported by the second track structure such that the base plate slides along the first track structure and the second track structure to move between the extended position and the retracted position.

13. The power routing system of claim 1, wherein the base plate includes a plurality of power interface locations configured to interface with an accessory, and wherein each power interface location includes an inductive charging member configured to interface with an inductive charging member on the accessory, and wherein inductive charging members on the base plate are charged via the power source.

14. The power routing system of claim 13, wherein the power connection member includes one or more connectors connected to a wiring harness for the inductive charging members that are associated with the base plate such that the inductive charging members for the base plate can receive power from the power source via the power connection member.

15. The power routing system of claim 14, wherein the power connection member includes a bottom wall, a first set of side walls extending up from one set of opposing edges of the bottom wall, a second set of side walls extending up from another set of opposing edges of the bottom wall and connecting the first set of side walls to each other, and a cover that is movable between an open position and a closed position to define an internal cavity in which the at least one first power outlet is located, and wherein the one or more connectors extend outwardly of the bottom wall, and wherein one of the first and second sets of side walls includes an opening through which an accessory electrical connector can extend to connect the accessory to the at least one second power outlet.

16. The power routing system of claim 1, wherein the base plate is mounted within a vehicle cargo area and includes a plurality of mounting apertures configured to receive one or more cleats associated with the accessory.

17. The power routing system of claim 1, wherein:
the electrical connector includes a first connector that connects the at least one first power outlet to a connector interface and a second connector that connects the connector interface to the at least one second power outlet; and
the first connector remains in a fixed position relative to the base plate while the second connector extends and retracts in response to movement of the base plate.

18. The power routing system of claim 17, including a bracket or box structure mounted to the fixed structure that provides a support and/or mounting location for the connector interface, and wherein the first connector comprises a first power cord and the second connector comprises a second power cord that coils and uncoils in response to movement of the base plate.

19. The power routing system of claim 1, wherein:
the base plate includes a plurality of mounting apertures configured to receive one or more cleats associated with the accessory;
the base plate includes a plurality of power interfaces configured to power an accessory, and wherein each power interface includes an inductive charging member configured to interface with an inductive charging member on the accessory, and wherein inductive charging members on the base plate are charged via the power source; and
each power interface is surrounded by a set of mounting apertures from the plurality of mounting apertures.

20. A power routing system, comprising:
a base plate mounted with a vehicle cargo area to provide a surface to support at least one accessory, wherein the base plate includes a plurality of mounting apertures to receive one or more cleats associated with the at least one accessory;
a first track structure configured to extend along one side of the vehicle cargo area;
a second track structure configured to extend along an opposite side of the vehicle cargo area, wherein the base plate is supported by the first track structure and the second track structure for sliding movement between extended and retracted positions;
a power source configured to provide power to the at least one accessory, the power source having at least one first power outlet located in a power panel associated with a vehicle wall that is adjacent to the vehicle cargo area;
a power connection member mounted to the base plate for movement with the base plate relative to the vehicle wall, wherein the power connection member includes at least one second power outlet and at least one connector associated with an inductive charging member; and
an adaptor associated with the power panel such that an electrical connector assembly can connect the at least one first power outlet to the power connection member such that the power connection member can supply power to the at least one accessory via the at least one second power outlet and/or via the at least one connector.

21. A method comprising:
providing a base plate that includes a surface to support an accessory;

mounting the base plate for sliding movement relative to a fixed vehicle structure within a vehicle cargo area between a retracted and extended position;

providing a power source configured to provide power to the accessory, the power source having at least one first power outlet that is mounted to the fixed vehicle structure;

mounting a power connection member to the base plate, such that the power connection member is fixed for movement with the base plate, and wherein the power connection member includes at least one second power outlet; and connecting the at least one first power outlet to the power connection member via an adaptor and an electrical connector assembly such that power can be provided to the accessory via the at least one second power outlet.

22. The method of claim 21, including mounting a power panel to the fixed vehicle structure adjacent the vehicle cargo area, and mounting the adaptor to the power panel such that the electrical connector assembly can be used to connect the at least one first power outlet to the power connection member.

23. The method of claim 21, wherein the electrical connector assembly includes a first connector and a second connector, and including:

connecting the at least one first power outlet to a connector interface with the first connector;

connecting the connector interface to the at least one second power outlet with and the second connector that connects; and holding the first connector in a fixed position relative to the base plate while the second connector extends and retracts in response to movement of the base plate.

24. The method of claim 21, including:

forming a plurality of mounting apertures in the base plate that are configured to receive one or more cleats associated with the accessory;

forming a plurality of power interfaces in the base plate includes that are configured to power an accessory, wherein each power interface includes an inductive charging member configured to interface with an inductive charging member on the accessory, and wherein inductive charging members on the base plate are charged via the power source; and surrounding each power interface with a set of mounting apertures from the plurality of mounting apertures.

* * * * *